US010540204B1

(12) United States Patent
Blessing et al.

(10) Patent No.: US 10,540,204 B1
(45) Date of Patent: *Jan. 21, 2020

(54) MODULE ASSIGNMENT MANAGEMENT

(71) Applicant: Palantir Technologies Inc., Palo Alto, CA (US)

(72) Inventors: Alexander Blessing, Brooklyn, NY (US); Justin Uang, New York, NY (US); Lawrence Manning, New York, NY (US); Mark Elliot, London (GB); Robert Kruszewski, London (GB)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/422,741

(22) Filed: May 24, 2019

Related U.S. Application Data

(63) Continuation of application No. 16/250,829, filed on Jan. 17, 2019, now Pat. No. 10,409,641.

(60) Provisional application No. 62/771,314, filed on Nov. 26, 2018.

(51) Int. Cl.
*G06F 9/48* (2006.01)

(52) U.S. Cl.
CPC ................... *G06F 9/4881* (2013.01)

(58) Field of Classification Search
CPC .... G06F 9/5027; G06F 9/4881; G06F 16/972; G06F 2209/5011; G06F 9/50; G06F 9/5038
See application file for complete search history.

(56) References Cited

U.S. PATENT DOCUMENTS

| 7,430,738 | B1* | 9/2008 | Sanders | G06F 9/5027 709/203 |
| 9,250,953 | B2* | 2/2016 | Kipp | G06F 9/46 |
| 2004/0044760 | A1* | 3/2004 | Deily | G06F 16/972 709/223 |
| 2015/0277993 | A1* | 10/2015 | Gu | G06F 9/52 718/102 |
| 2018/0129533 | A1* | 5/2018 | Pashov | G06F 9/4881 |

\* cited by examiner

*Primary Examiner* — Dong U Kim
(74) *Attorney, Agent, or Firm* — Sheppard Mullin Richter & Hampton LLP

(57) ABSTRACT

Systems, methods, and non-transitory computer readable media are provided for managing assignment of modules. A job from a client may be received. The job may be inserted into a job queue. The job within the job queue may be compared with a set of cooldown modules to determine whether a compatible cooldown module is available. The job may be assigned to the compatible cooldown module responsive to the compatible cooldown module being available.

20 Claims, 5 Drawing Sheets

MODULE ASSIGNMENT MANAGEMENT

CROSS REFERENCE TO RELATED APPLICATIONS

This application is a continuation of U.S. Ser. No. 16/250,829, filed Jan. 17, 2019, which claims the benefit under 35 U.S.C. § 119(e) of U.S. Provisional Application Ser. No. 62/771,314 filed Nov. 26, 2018, the content of which is incorporated by reference in its entirety into the present disclosure.

FIELD OF THE INVENTION

This disclosure relates to approaches for managing assignment of modules.

BACKGROUND

Under conventional approaches, a module for performing a task may be started based on a job request from a client. A module may consume resources and starting a new module for each new job request may be resource intensive. Additionally, starting a new module may take time. On the other hand, assignment of multiple jobs to a single module may require queuing of jobs within the module, which may not be transparent. Assignment of multiple jobs to a single module may also lack job isolation. For instance, a faulty job within a module may affect other jobs running within the module or go out of memory.

SUMMARY

Various embodiments of the present disclosure may include systems, methods, and non-transitory computer readable media configured to facilitate management of module assignment. A job from a client may be received. The job may be inserted into a job queue. The job within the job queue may be compared with a set of cooldown modules to determine whether a compatible cooldown module is available. The job may be assigned to the compatible cooldown module responsive to the compatible cooldown module being available.

In some embodiments, one or more modules may be limited to assignment of a single job. The limitation of assignment of the single job to the module(s) may provide job isolation for the module(s).

In some embodiments, compatibility between the job and the compatible cooldown module may be determined based on a coding language of the job and the compatible cooldown module.

In some embodiments, the set of cooldown modules may include one or more modules that have completed one or more assigned jobs. Responsive to none of the module(s) within the set of cooldown modules being compatible with the job, the module(s) may be terminated.

In some embodiments, a new module may be processed for the job. The job may be assigned to the new module responsive to the new module being ready and the compatible cooldown module not being available. In some embodiments, responsive to the compatible cooldown module being available, processing of the new module for the job may be terminated.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
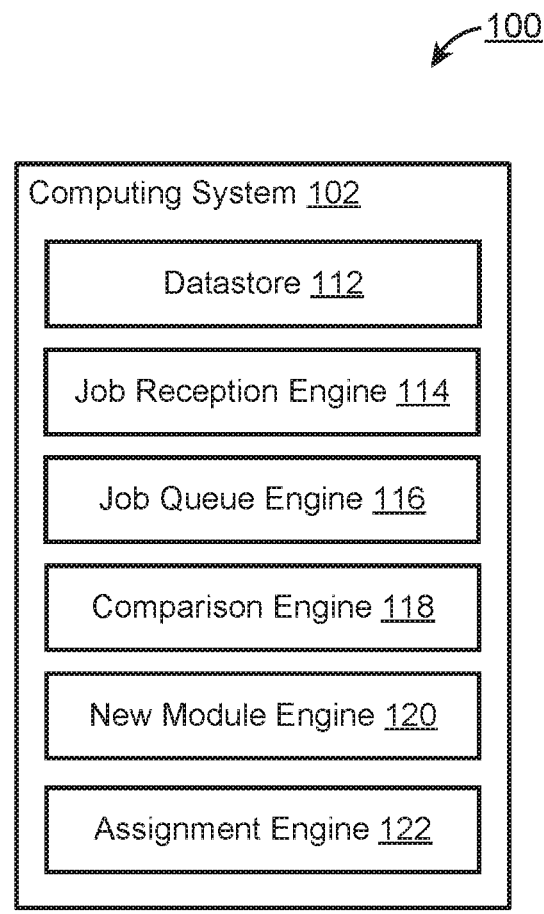
FIG. 1 illustrates an example environment for managing module assignment, in accordance with various embodiments.

A claimed solution rooted in computer technology overcomes problems specifically arising in the realm of computer technology. In various implementations, a computing system is configured to receive a job from a client; insert the job into a job queue; compare the job within the job queue with a set of cooldown modules to determine whether a compatible cooldown module is available; and assign the job to the compatible cooldown module responsive to the compatible cooldown module being available.

In some embodiments, one or more modules may be limited to assignment of a single job. That is, the module(s) may be assigned to one job at a time. The limitation of assignment of the single job to the module(s) may provide job isolation for the module(s). A faulty job within such a module may not affect other jobs within other modules.

In some embodiments, compatibility between the job and the compatible cooldown module may be determined based on a coding language of the job and the compatible cooldown module. For example, a job coded in Python may be compatible with a module coded in Python while a job coded in Java may be compatible with a module coded in Java.

In some embodiments, the set of cooldown modules may include one or more modules that have completed one or more assigned jobs. That is, the set of cooldown modules may include those modules that have completed their assigned jobs, have not been assigned a new job, and have not been terminated. The set of cooldown modules may be compared within one or more jobs within the job queue to determine the compatibility between the set of cooldown modules and the job(s). Job(s) within the job queue may be compared to the set of cooldown modules in a first-in, first-out (FIFO) fashion. FIFO queuing of jobs within the job queue may be relaxed to allow later-queued jobs to be assigned to compatible cooldown modules before earlier-queued jobs.

In some embodiments, responsive to none of the module(s) within the set of cooldown modules being compatible with the job, the module(s) may be terminated. That is, based on none of the cooldown modules being compatible with the job, the cooldown modules may be terminated. Such termination of cooldown modules may free up resources.

In some embodiments, a new module may be processed for the job. The job may be assigned to the new module responsive to the new module being ready and the compatible cooldown module not being available. Such assignment of jobs to modules may provide for reuse of existing modules while generating new modules when or in case compatible modules are not available.

In some embodiments, responsive to the compatible cooldown module being available, processing of the new module for the job may be terminated. For instance, processing of the new module may include requesting the new module to be started. Starting the new module may take time and resource. Before the new module is started and ready for the job, a cooldown module that is compatible with the job may be identified and the starting of the new module may be terminated to conserve resources.

The approaches disclosed herein facilitates management of module assignment. A module manager may receive jobs from clients and may assign the job to compatible modules. The modules to which the jobs are assigned may include cooldown modules and/or new modules. A job queue may be used to compare and assign jobs to cooldown modules. A job may be assigned to an available cooldown module based on the cooldown modules being compatible with the job. A job may be assigned to a new module based on cooldown modules not being compatible with the job.

FIG. 1 illustrates an example environment 100 for managing modules assignment. The example environment 100 may include a computing system 102. The computing system 102 may include one or more processors and memory. The processor(s) may be configured to perform various operations by interpreting machine-readable instructions stored in the memory. The environment 100 may also include one or more datastores (not shown) that is accessible to the computing system 102 (e.g., via one or more network(s)). In some embodiments, the datastore(s) may include various databases, application functionalities, application/data packages, and/or other data that are available for download, installation, and/or execution.

In various embodiments, the computing system 102 may include a datastore 112, a job reception engine 114, a job queue engine 116, a comparison engine 118, an assignment engine 120, other engines, and/or other components. The datastore 112 may include structured and/or unstructured sets of data that can be divided/extracted for provision when needed by one or more components of the environment 100. The datastore 112 may include one or more datasets of information. The datastore 112 may include one or more databases. The datastore 112 may include different data analysis modules that facilitate different data analysis tasks, patches for the applications/systems, custom application/functionalities built for particular application/systems, and/or other information to be used in the environment 100. While the computing system 102 is shown in FIG. 1 as a single entity, this is merely for ease of reference and is not meant to be limiting. One or more components/functionalities of the computing system 100 described herein may be implemented in a single computing device or multiple computing devices.

In various embodiments, the job reception engine 114 may be configured to receive one or more jobs from a client. A job may be received directly from a client and/or indirectly through one or more intermediary/communication devices. A client may refer to hardware or software that uses and/or accesses one or more services made available by a server. For example, a client may include a computer, a computer component, an application, an application component, a process and/or other hardware/software that request one or more operations to be performed by or through a server. A client and a server may be part of the same computing system or may be on different computing systems. For example, a client may communicate with a server through one or more networks.

A job may refer to a unit of work to be performed. A job may include one or more operations to be performed. For example, a job may include an application of a module to do work, such as reading, writing, and/or transforming data. Other types of jobs are contemplated. A job may be performed by one or more modules (workers). A module may refer to software, a software component, a program, or a part of a program that includes one or more routines to perform work. A module may include one or more routines for performing a particular work or a particular portion of a work. A module may provide endpoints (e.g., HTTP endpoints) for starting and canceling jobs.

Running a module may consume resources, such as processing power, processing time, and/or memory. The number of modules that may be run at once may be limited by the pool of available resources. Starting up a module for a job take some amount of time. For example, starting up a work for some jobs may take up to 1-2 minutes.

A module manager may assign jobs to modules. A module manager may accept income jobs from clients and submit the jobs to modules. A job may be only assigned to a compatible module. Compatibility between a job and a module may be determined based on the user ID, the coding language being used, the libraries referenced by the job/module and configuration settings. For example, compatibility between a job and a module may be determined based on a coding language of the job and the compatible cooldown module. For instance, a job coded in Python may be compatible with a module coded in Python while a job coded in Java may be compatible with a module coded in Java. [Please confirm whether the compatibility between a module/worker and a job are determined based on the coding language or some other identifier, such as binary type] [Please add any other criteria by which compatibility between a module/worker and a job are determined]

Two extreme examples of module assignment (scheduling) are described below. In one extreme example, all jobs may be assigned to a single module. A module manager may submit all jobs to the same module. The advantage of such module assignment may include maximal reuse of module. That is, no time is spent to start up new modules for jobs. The disadvantage of such module assignment may include (1) queuing of jobs within a module, which may not be transparent to users, and (2) lack of job isolation—a faulty job within a module may go out of memory and/or affect other job(s) running within the same module.

In another extreme example, each new job may be assigned to a new module. A module manager may request a new module be started for each new job and assign the job to the new module. The advantage of such module assignment may include (1) job isolation, and (2) no queuing of jobs within the module. The disadvantage of such module assignment may include (1) no reuse of module, and (2) greater consumption of resources from starting new modules.

The module assignment of the present disclosure may include both assignment of modules to new modules and reuse of existing modules. The module assignment of the present disclosure may assign a job to an existing compatible module when it is available and to a new module when an existing compatible module is not available. This combination of reuse of existing modules with starting up of new modules may be implemented using a job queue. Additionally, one or more modules may be limited to assignment of a single job. The advantage of this module assignment may include (1) transparent queuing of jobs, (2) no queuing of jobs within a module, (3) job isolation, and (4) reuse of existing modules, thereby increasing throughput. Moreover, the module assignment of the present disclosure may guarantee that all received jobs will eventually execute, thereby ensuring no starvation of jobs (no job is left unexecuted).

In various embodiments, the job queue engine 116 may be configured to insert the job into a job queue. A job queue may refer to a line, a sequence, a list and/or other ordering of jobs awaiting assignment to a module. The job queue engine 116 may insert the job into a job queue based on the order in which the job is received. For example, the latest received job may be inserted at the end of the job queue. Such insertion of jobs into the job queue may result in earlier received jobs being located earlier in the job queue than later received jobs. In some embodiments, the job queue engine 116 may insert the job into a job queue based on the job and/or other information. For example, a received job may have a higher priority than jobs within the job queue, and the received job may be inserted into the job queue based on the corresponding priorities of the jobs such that jobs with higher priority are located earlier in the job queue than jobs with lower priority. In some embodiments, a limit may be imposed on how many times a job may be pushed back within the job queue. For example, indefinitely allowing reordering of jobs within the job queue based on priorities may result in a lower priority job continually being pushed back within the job queue and not reaching the beginning/beginning portion of the job queue, which may result in such a job not being assigned to a module (job starvation). To prevent starvation of such lower priority jobs, a job may be allowed to be pushed back within the job queue a limited number of times based on priority of jobs. This may ensure that a job within the job queue will reach the beginning/beginning portion of the job queue.

In various embodiments, the comparison engine 118 may be configured to compare the job within the job queue with a set of cooldown modules to determine whether a compatible cooldown module is available. A set of cooldown modules may include one or more cooldown modules. A cooldown module may refer to a module that has completed its assigned job(s), has not been assigned a new job, and has not been terminated. Thus, a set of cooldown modules may include one or more modules that have completed their assigned jobs, have not been assigned a new job, and have not been terminated. A cooldown module may be terminated if it is not assigned to a new job. The life length of a cooldown module (duration for which a module is kept alive after completing its job(s) and during which it may be assigned a new job) may be configurable. In some embodiments, different cooldown modules may have different life lengths. For example, a cooldown module that requires greater expenditure of resources to start up and/or a cooldown module that performs a job that is frequently received may be configured to have longer life length than a cooldown module that requires less expenditure of resources to start up and/or a cooldown module that performs a job that is seldom received.

A compatible cooldown module may refer to a cooldown module that is compatible with the job. Thus, the comparison engine 118 may compare the job within the job queue with the set of cooldown modules to determine whether the set of cooldown modules includes a module that is compatible with the job. Compatibility between the job within the job queue and a cooldown module may be determined based on one or more of identifiers (e.g., user ID), job and module type (e.g. coding language used), referenced libraries, configuration setting, and/or other information.

The comparison engine 118 may compare a single job or multiple jobs within the job queue to the set of cooldown modules to determine the compatibility between the set of cooldown modules and the job(s). The job(s) within the job queue may be compared to the set of cooldown modules in a first-in, first-out (FIFO) fashion. For example, the comparison engine 118 may compare the first job within the job queue (the job at the start of the job queue) to the set of cooldown modules or compare a certain number of jobs at the start of the job queue to the set of cooldown modules. For instance, the comparison engine 118 may compare the first five jobs within the job queue to the set of cooldown modules to determine whether any of those five jobs are compatible with the set of cooldown modules.

The FIFO queuing of jobs within the job queue may be relaxed to allow later-queued jobs to be assigned to compatible cooldown modules before earlier-queued jobs. For example, the second job within the job queue may be allowed to be assigned to a compatible cooldown module before the first job within the job queue. In some embodiments, a limit may be imposed on how many times a job may be skipped to allow assignment of later jobs within the job queue. That is, there may be a limit on how many times a particular job within the job queue may be skipped from finding a compatible cooldown module. For example, if the comparison engine 118 compares the first five jobs within the job queue to the set of cooldown modules, the comparison engine 118 may continually find compatible cooldown modules for the second, third, fourth, and/or fifth job. Indefinitely allowing the comparison engine 118 to find available and compatible cooldown modules for lower-located jobs within the job queue may result in job starvation for the first job (the first job not being assigned to a module). To prevent starvation of jobs within the job queue, a job may be allowed to be skipped a set number of time (e.g., allow skipping of a job a maximum of three times).

In some embodiments, the comparison engine 118 may compare job(s) within the job queue to the set of cooldown modules based on one or more cooldown modules becoming available. For example, when one or a certain number of cooldown modules becomes available, the comparison engine 118 may inspect the job queue to determine whether the cooldown module(s) are compatible with one or more jobs within the job queue. The comparison engine 118 may compare job(s) within the job queue to the set of cooldown modules based on a number of jobs within the job queue. For example, when one or a certain number of jobs are within the job queue, the comparison engine 118 may inspect the set of cooldown modules to determine whether one or more jobs within the job queue are compatible with any cooldown modules. The comparison engine 118 may compare job(s)

within the job queue to the set of cooldown modules on a periodic basis. For example, the comparison engine 118 may be set compare one or more jobs within the job queue to the set of cooldown modules on regular basis or irregular basis. The comparison engine 118 may compare job(s) within the job queue to the set of cooldown modules based on a request for comparison. For example, the comparison engine 118 may be set compare one or more jobs within the job queue to the set of cooldown modules based on a request from a process for the comparison.

In some embodiments, responsive to none of the cooldown module(s) within the set of cooldown modules being compatible with the job(s), the cooldown module(s) may be terminated. For example, responsive to the first job within the job queue not being compatible with any cooldown modules, one or more of the cooldown modules within the net of cooldown module may be terminated. As another example, responsive to none of a certain number of jobs at the start of the job queue not being compatible with any cooldown modules, the cooldown modules may be terminated. Such termination of cooldown modules may free up resources. In some embodiments, freeing up of resources may be necessary to start a new module for the job(s) within the job queue. The cooldown modules may be expending resources and keeping the cooldown modules alive may not leave enough resource for a new module to be started. If cooldown modules are not terminated, a compatible module for the job(s) within the job queue may not become available.

In some embodiments, all of the cooldown modules within the set of cooldown modules may be terminated. In some embodiments, only some of the cooldown modules within the set of cooldown modules may be terminated. For example, cooldown modules compatible with more frequently received jobs may be kept alive while cooldown modules compatible with less frequently received jobs may be terminated. As another example, the life lengths of cooldown modules may be reduced so that they terminate sooner. As yet another example, the life lengths of different cooldown modules may be changed differently (e.g., reduced, increased) so that cooldown modules compatible with more frequently received jobs are kept alive longer than cooldown modules compatible with less frequently received jobs.

In various embodiments, the new module engine 120 may be configured to process a new module for the job within the job queue. Processing of a new module for a job may include starting the new module and/or requesting that the new module be started. The processing of the new module for the job may be performed in parallel or after the comparison of the job to the set of cooldown modules. For example, based on the reception of the job, (1) the job may be inserted into the job queue and the job within the job queue may be compared with a set of cooldown modules, and (2) a new module for the job may be processed. Allowing the processing of the new module and the comparison with the set of cooldown modules to proceed in parallel may allow the computing system 102 to assign the job to earlier of the compatible cooldown module or the new module that becomes available.

As another example, based on the reception of the job, the job may be inserted into the job queue and the job within the job queue may be compared with a set of cooldown modules to determine if a compatible cooldown module is available. If a compatible cooldown module is not viable, a new module for the job may be processed. Processing of the new module based on determination that no compatible cooldown module is available may enable the computing system 102 to identify a compatible cooldown module without starting up a new module.

In some embodiments, responsive to the compatible cooldown module being available, processing of the new module for the job may be terminated. That is, based on the comparison engine 118 finding a compatible cooldown module within the set of cooldown module (determining that a compatible cooldown module is available for assignment to the job), processing of the new module for the job may be terminated. Processing the new module may take time and expenditure of resources. Before the new module is started and ready for the job, a cooldown module that is compatible with the job may be identified and the starting of the new module may be terminated to conserve resources. For example, based on the reception of the job, the job may be compared with cooldown modules and a new module may be started for the job. Based on the comparison of the job finding a compatible cooldown module before the new module is ready, the processing of the new module may be terminated. As another example, based on an initial comparison of the job with cooldown modules not finding any compatible cooldown modules, a new module may be started for the job. During processing of the new module, a new cooldown which is compatible with the job may become available. Based on the availability of the new compatible cooldown module, the processing of the new module may be terminated.

In various embodiments, the assignment engine 122 may be configured to assign the job to one or more modules. Assignment of the job to a module may prompt execution of the unit of work of the job (e.g., one or more operations, such as reading, writing, and/or transforming data) by the module. The assignment engine 112 may assign the job to a module based on the availability of the module to take on the job. For example, the assignment engine 122 may assign the job to a compatible cooldown module responsive to the compatible cooldown module being available. For instance, the comparison of the job with the cooldown modules may identify a compatible cooldown module, and the job may be assigned to the compatible cooldown module.

As another example, the assignment engine 122 may assigned the job to a new module responsive to the new module being ready and a compatible cooldown module not being available. For instance, a new module may be processed for the job and become ready to take on the job before a compatible cooldown module is identified, and the job may be assigned to the new module. Such assignment of jobs to modules may provide for reuse of existing modules while generating new modules when or in case compatible modules are not available.

In some embodiments, one or more modules (e.g., cooldown modules, new module) may be limited to assignment of a single job. That is, the module(s) may be assigned to one job at a time. The limitation of assignment of the single job to the module(s) may provide job isolation for the module(s) such that a faulty job within a module may not affect other jobs within other modules. In some embodiments, one or more modules may be limited to assignment of a single job while one or more other modules may not be limited to assignment of a single job. That is, there may be a mixture of module(s) that are only allowed to run a single job at once and module(s) that are allowed to run multiple jobs at once.

Figure 2:
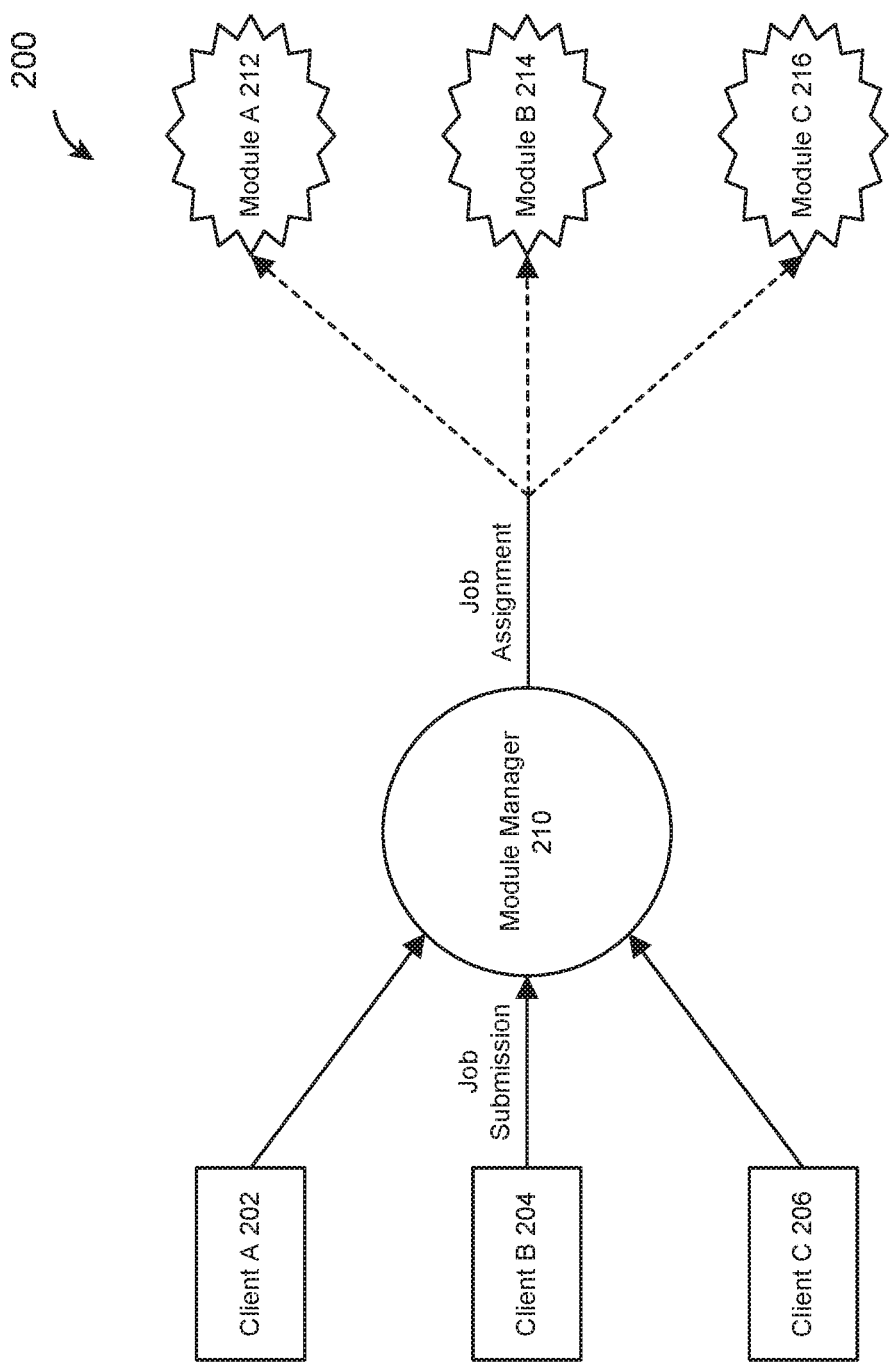
FIG. 2 illustrates an example diagram for managing module assignment, in accordance with various embodiments.

FIG. 2 illustrates an example diagram 200 for managing module assignment, in accordance with various embodiments. The diagram 200 includes a client A 202, a client B 204, a client C 206, a module manager 210, a module A 212, a module B 214, and a module C 214. The clients 202, 204, 206 may submit jobs to the module manager 210. The module manager 210 may assign the jobs to one or more modules, such as the module A 212, the module B 214, and/or the module C 216. That is, the module manager may coordinate the assignment of jobs from multiple clients 202, 204, 206 among multiple modules 212, 214, 216. The module manager 210 may assign the jobs from the client 202, 204, 206 to the modules 212, 214, 216 based on compatibility between the jobs and the modules 212, 214, 216, the availability of the modules 212, 214, 216 to be assigned the job, and/or other information. One or more of the modules 212, 214, 216 may include a cooldown module. That is, one or more of the modules 212, 214, 216 may be a module that has completed its assigned job(s), has not been assigned a new job, and has not been terminated. One or more of the modules 212, 214, 216 may include a new module that has been processed for the job received by the module manager 210. One or more of the modules 212, 214, 216 may be limited to assignment of a single job and may provide job isolation.

In some embodiments, the jobs may be submitted to particular job channels. Different jobs channels may have different amount of resources. Dedicating particular modules to a resource channel may increase the likelihood of reuse of the modules. For example, different modules for different jobs may be separated into different resource channels. Such separation of modules into resource channels may make it more likely that a compatible cooldown module will be available for a job. For instance, a particular type of a job may be important and/or often submitted, and a resource channel may be dedicated to the module(s) for performing the job type. Routing the submitted jobs of this job type to the dedicated resource channel may make it more likely that a cooldown module compatible with the job type will be and/or become available for reuse.

Figure 3:
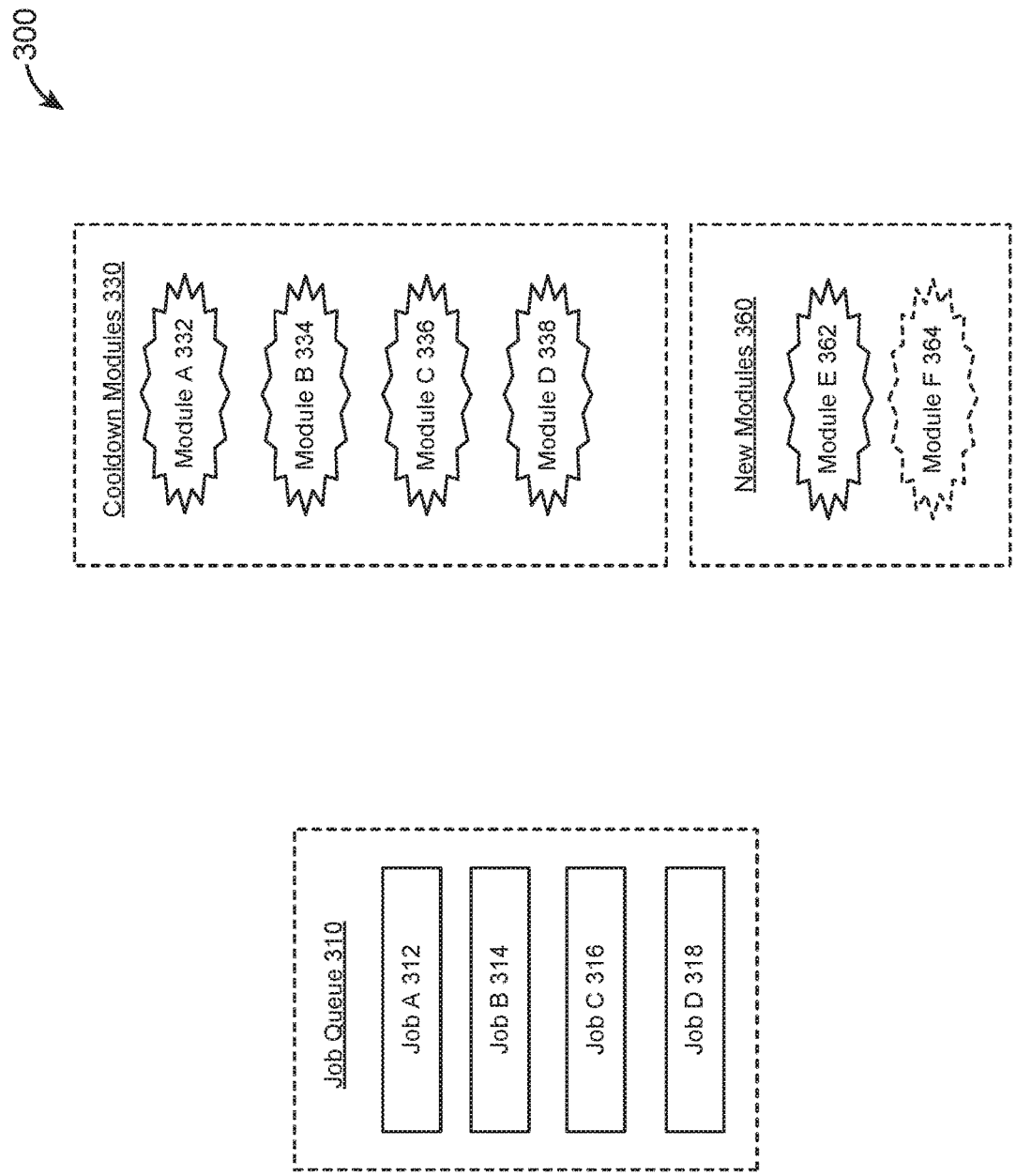
FIG. 3 illustrate an example diagram of a job queue and modules, in accordance with various embodiments.

FIG. 3 illustrate an example diagram 300 of a job queue and modules, in accordance with various embodiments. The example diagram 300 may include a job queue 310, cooldown modules 330, and new modules 360. The job queue 310 may include multiple jobs (a job A 312, a job B 314, a job C 316, a job D 318) in a line, a sequence, a list and/or other ordering. The jobs 312, 314, 316, 318 may include jobs awaiting assignment to a module. The cooldown modules 330 (a module A 332, a module B 334, a module C 336, a module D 338) may include modules that have completed their assigned job(s), have not been assigned a new job, and have not been terminated. The new modules 360 (a module E 362, a module F 364) may include modules that have been and/or are being processed for one or more of the jobs 312, 314, 316, 318. For instance, the module E 362 may be a module that has been processed and available for one of the jobs 312, 314, 316, 318 and the module F 364 may be a module that is being processed and is not yet available for one of the jobs 312, 314, 316, 318.

One or more of the jobs 312, 314, 316, 318 may be compared with the modules 332, 334, 336, 338 to determine the compatibility between the jobs 312, 314, 316, 318 and the modules 332, 334, 336, 338. For example, the first job, the job A 312, within the job queue 310 may be compared with the modules 332, 334, 336, 338 to determine if any of the modules 332, 334, 336, 338 are compatible with the job A 312. The job A 312 may be assigned to one of the cooldown module(s) determined to be compatible. As another example, the first three jobs, the job A 312, the job B 314, and the job C 316, may be compared with the modules 332, 334, 336, 338 to determine if any of the modules 332, 334, 336, 338 are compatible with any of the jobs 312, 314, 316, and one or more of the jobs 312, 314, 316 may be assigned to a compatible cooldown module. The job A 312 and/or the job B 314 may be allowed to be skipped by a lower-located job, such as the job C 316, only a limited number of times. If none of the modules 332, 334, 336, 338 are compatible with the compared job(s), one or more of the modules 332, 334, 336, 338 may be terminated to conserve resources.

A job may be assigned to a new module responsive to the new module being ready. For example, the module E 362 may have been proceed based on reception of the job C 316 and/or based on none of the modules 332, 334, 336, 338 being compatible with the job C 316. The job C 316 may be assigned to the module E 362 based on the module E 362 being ready.

The processing of a new module may be terminated based on a compatible cooldown module being available. For example, the module F 364 may be being processed based on reception of the job D 318 and/or none of the cooldown modules being compatible with the job D 318. During the processing of the module F 364, the module D 338, which is compatible with the job D 318, may become available for assignment of a new job. The job D 318 may be assigned to the module D 338 and the processing of the module F 364 may be terminated.

Figure 4:
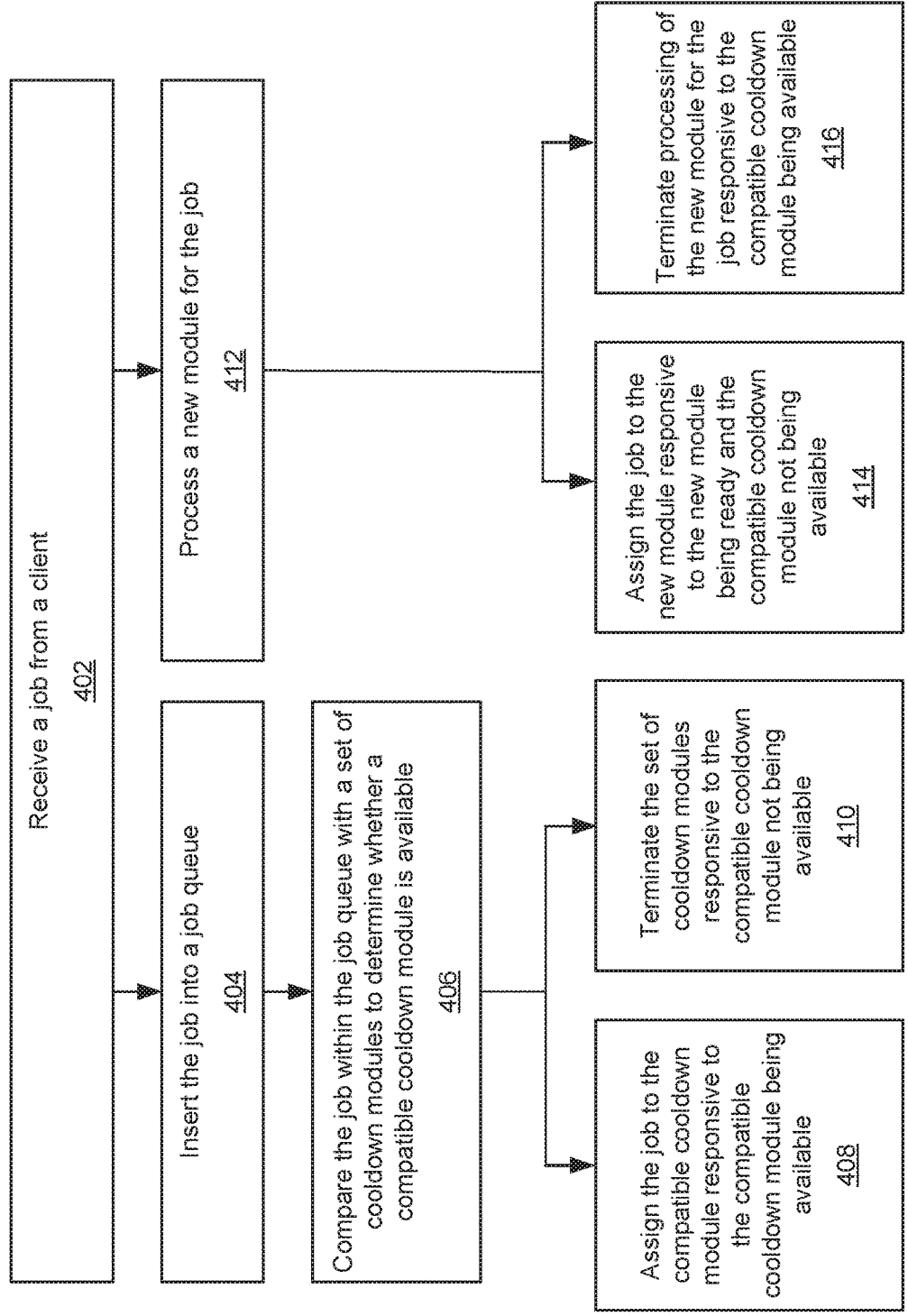
FIG. 4 illustrates a flowchart of an example method, in accordance with various embodiments.

FIG. 4 illustrates a flowchart of an example method 400, according to various embodiments of the present disclosure. The method 400 may be implemented in various environments including, for example, the environment 100 of FIG. 1. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, a job from a client may be received. At block 404, the job may be inserted into a job queue. At block 406, the job within the job queue may be compared with a set of cooldown modules to determine whether a compatible cooldown module is available. At block 408, the job may be assigned to the compatible cooldown module responsive to the compatible cooldown module being available. At block 410, the set of cooldown modules may be terminated responsive to the compatible cooldown module not being available. At block 412, a new module for the job may be processed. At block 414, the job may be assigned to the new module responsive to the new module being ready and the compatible cooldown module not being available. At block 416, processing of the new module for the job may be terminated responsive to the compatible cooldown module being available.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
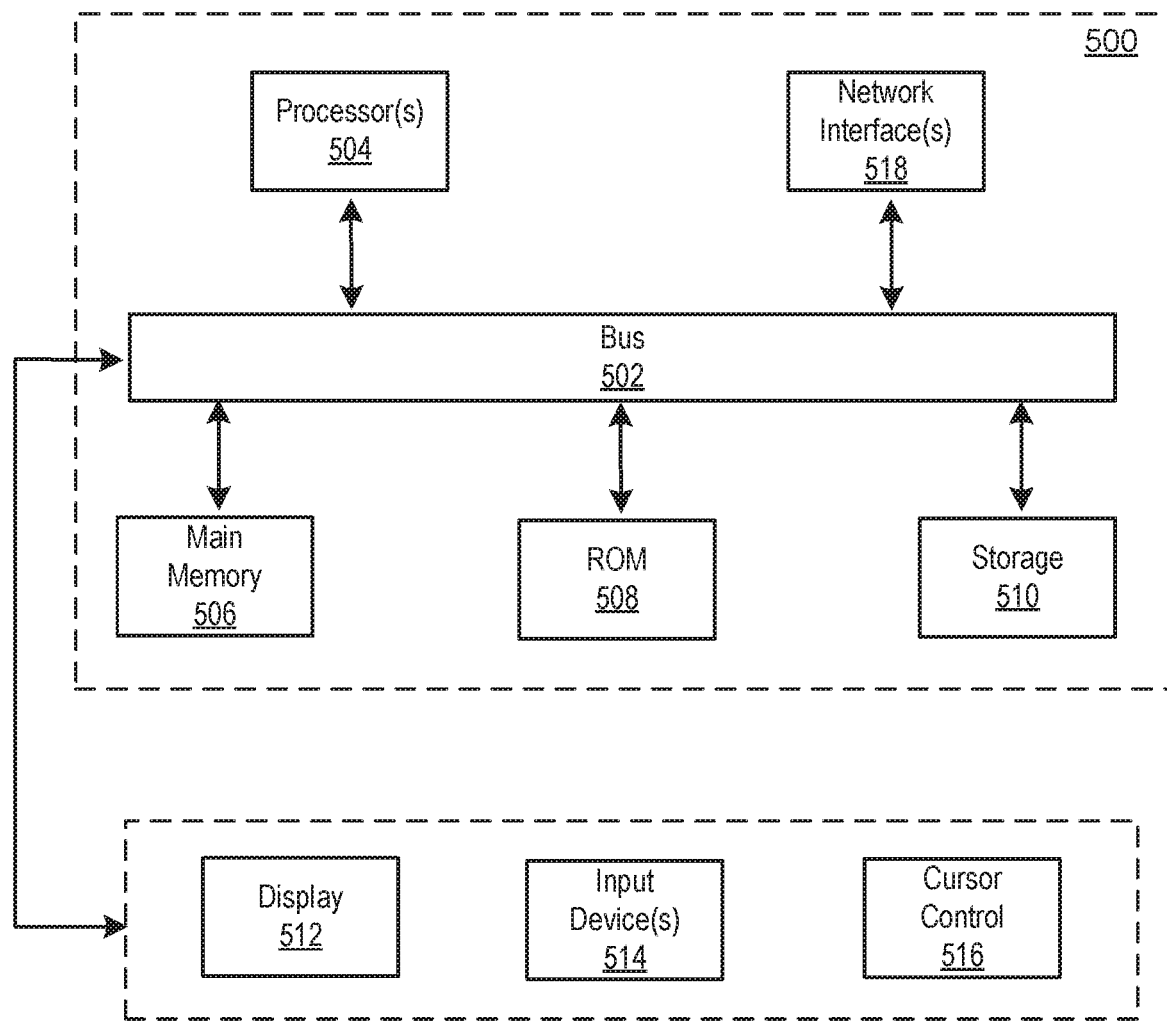
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
memory storing instructions that, when executed by the one or more processors, cause the system to perform:
  receiving a job from a client;
  inserting the job into a job queue;
  comparing the job within the job queue with a set of modules to determine whether a compatible module is available;
  in response to the compatible module being available, assigning the job to the compatible module; and
  in response to the compatible module completing the job, adjusting a life length of the compatible module, wherein the life length is a duration the compatible module is kept and during which the compatible module can be assigned to a new job.

2. The system of claim 1, wherein the adjusting the life length of the compatible module comprises:
configuring the compatible module to have a longer life length if the compatible module requires a larger resource expenditure to start up; and
configuring the compatible module to have a shorter life length if the compatible module requires a smaller resource expenditure to start up.

3. The system of claim 1, wherein the adjusting the life length of the compatible module comprises:
configuring the compatible module to have a longer life length if the job assigned to the compatible module is more frequently received; and
configuring the compatible module to have a shorter life length if the job assigned to the compatible module is less frequently received.

4. The system of claim 1, wherein the adjusting the life length of the compatible module comprises not terminating the compatible module.

5. The system of claim 1, wherein the compatible module has completed a previously assigned job, has not been assigned a new job, and has not been terminated.

6. The system of claim 1, wherein the memory storing instructions further causes the system to perform:
receiving a second job and a third job from the client;
inserting the second job and the third job into the job queue;
comparing the job, the second job, and the third job within the job queue with the set of modules in a first-in, first-out (FIFO) fashion to determine whether any of the job, the second job, and the third job are compatible with a second module of the set of modules; and
in response to any of the job, the second job, and the third job being compatible with the second module of the set of modules, assigning whichever of the job, the second job, and the third job is compatible with the second module to the second module.

7. The system of claim 1, wherein the memory storing instructions further causes the system to perform:
receiving a second job and a third job from the client;
inserting the second job and the third job into the job queue;
comparing the job, the second job, and the third job within the job queue with the set of modules in a relaxed first-in, first-out (FIFO) fashion to determine whether any of the job, the second job, and the third job are compatible with a second module of the set of modules; and
in response to any of the job, the second job, and the third job being compatible with the second module of set of modules, assigning whichever of the job, the second job, and the third job is compatible with the second module to the second module, wherein:
the relaxed FIFO fashion comprises setting a maximum number of times an earlier job can be skipped to allow assignment of a later job before the earlier job.

8. The system of claim 1, wherein the memory storing instructions further causes the system to perform:
if the compatible module is determined not to be available:
initiating creation of a new module for the job;
determining whether the compatible module becomes available during the creation of the new module; and
in response to the compatible module becoming available during the creation of the new module, assigning the job to the compatible module.

9. A method implemented by a computing system including one or more processors and storage media storing machine-readable instructions, wherein the method is performed using the one or more processors, the method comprising:
receiving a job from a client;
inserting the job into a job queue;
comparing the job within the job queue with a set of modules to determine whether a compatible module is available;
in response to the compatible module being available, assigning the job to the compatible module; and
in response to the compatible module completing the job, adjusting a life length of the compatible module, wherein the life length is a duration the compatible module is kept and during which the compatible module can be assigned to a new job.

10. The method of claim 9, wherein the adjusting the life length of the compatible module comprises:
configuring the compatible module to have a longer life length if the compatible module requires a larger resource expenditure to start up; and
configuring the compatible module to have a shorter life length if the compatible module requires a smaller resource expenditure to start up.

11. The method of claim 9, wherein the adjusting the life length of the compatible module comprises:
configuring the compatible module to have a longer life length if the job assigned to the compatible module is more frequently received; and
configuring the compatible module to have a shorter life length if the job assigned to the compatible module is less frequently received.

12. The method of claim 9, wherein the adjusting the life length of the compatible module comprises not terminating the compatible module.

13. The method of claim 9, wherein the compatible module has completed a previously assigned job, has not been assigned a new job, and has not been terminated.

14. The method of claim 9, further comprising:
receiving a second job and a third job from the client;
inserting the second job and the third job into the job queue;
comparing the job, the second job, and the third job within the job queue with the set of modules in a first-in, first-out (FIFO) fashion to determine whether any of the job, the second job, and the third job are compatible with a second module of the set of modules; and
in response to any of the job, the second job, and the third job being compatible with the second module of the set of modules, assigning whichever of the job, the second job, and the third job is compatible with the second module to the second module.

15. The method of claim 9, further comprising:
receiving a second job and a third job from the client;
inserting the second job and the third job into the job queue;
comparing the job, the second job, and the third job within the job queue with the set of modules in a relaxed first-in, first-out (FIFO) fashion to determine whether any of the job, the second job, and the third job are compatible with a second module of the set of modules; and
in response to any of the job, the second job, and the third job being compatible with the second module of the set of modules, assigning whichever of the job, the second job, and the third job is compatible with the second module to the second module, wherein:
the relaxed FIFO fashion comprises setting a maximum number of times an earlier job can be skipped to allow assignment of a later job before the earlier job.

16. The method of claim 9, further comprising:
if the compatible module is determined not to be available:
initiating creation of a new module for the job;
determining whether the compatible module becomes available during the creation of the new module;
in response to the compatible module becoming available during the creation of the new module, assigning the job to the compatible module.

17. A non-transitory computer readable medium comprising instructions that, when executed, cause one or more processors to perform:
receiving a job from a client;
inserting the job into a job queue;
comparing the job within the job queue with a set of modules to determine whether a compatible module is available;
in response to the compatible module being available, assigning the job to the compatible module; and
in response to the compatible module completing the job, adjusting a life length of the compatible module, wherein the life length is a duration the compatible module is kept and during which the compatible module can be assigned to a new job.

18. The non-transitory computer readable medium of claim 17, wherein the adjusting the life length of the compatible module comprises:
configuring the compatible module to have a longer life length if the compatible module requires a larger resource expenditure to start up; and configuring the compatible module to have a shorter life length if the compatible module requires a smaller resource expenditure to start up.

19. The non-transitory computer readable medium of claim 17, wherein the adjusting the life length of the compatible module comprises:
configuring the compatible module to have a longer life length if the job assigned to the compatible module is more frequently received; and
configuring the compatible module to have a shorter life length if the job assigned to the compatible module is less frequently received.

20. The non-transitory computer readable medium of claim 17, wherein the instructions further cause the system to perform:
receiving a second job and a third job from the client;
inserting the second job and the third job into the job queue;
comparing the job, the second job, and the third job within the job queue with the set of modules in a relaxed first-in, first-out (FIFO) fashion to determine whether any of the job, the second job, and the third job are compatible with a second module of the set of modules; and
in response to any of the job, the second job, and the third job being compatible with the second module of the set of modules, assigning whichever of the job, the second job, and the third job is compatible with the second module to the second module, wherein:
the relaxed FIFO fashion comprises setting a maximum number of times an earlier job can be skipped to allow assignment of a later job before the earlier job.

* * * * *